Jan. 13, 1970 C. COOLEY, JR 3,489,174
POSITION LOCKABLE, TORSION SPRING-BALANCED FLUID LOADING ARM
Filed May 9, 1967
3 Sheets-Sheet 1
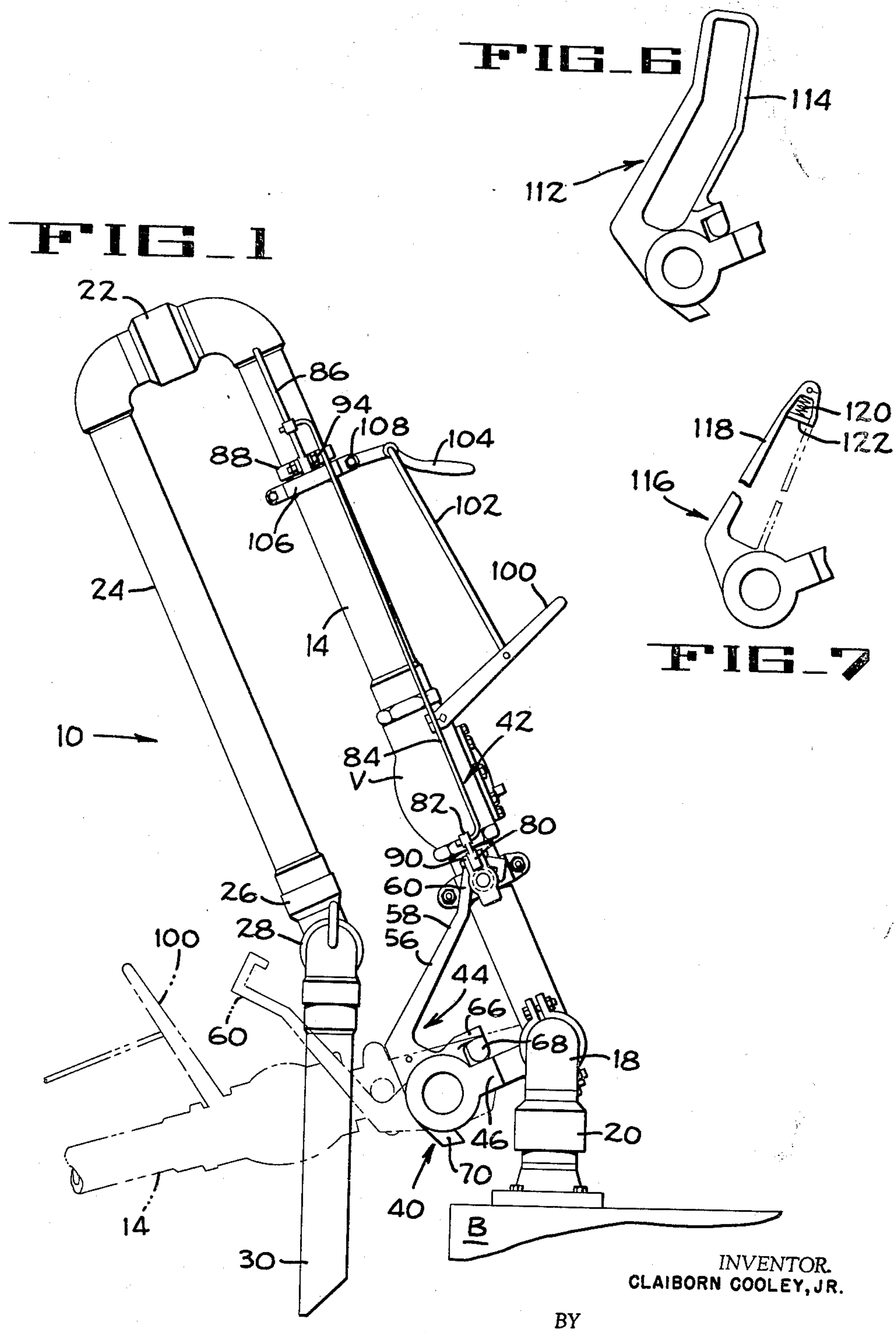
INVENTOR.
CLAIBORN COOLEY, JR.
BY
Francis W. Anderson
ATTORNEY Jan. 13, 1970 C. COOLEY, JR 3,489,174
POSITION LOCKABLE, TORSION SPRING-BALANCED FLUID LOADING ARM
Filed May 9, 1967 3 Sheets-Sheet 2
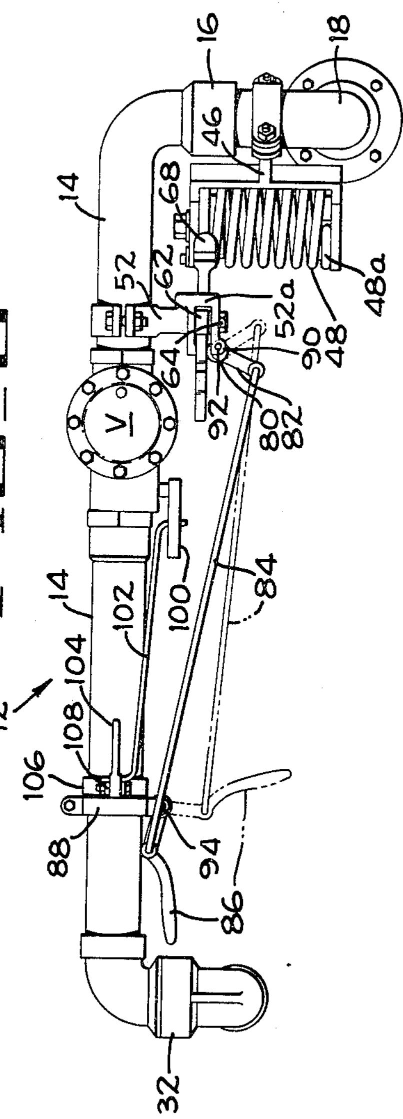
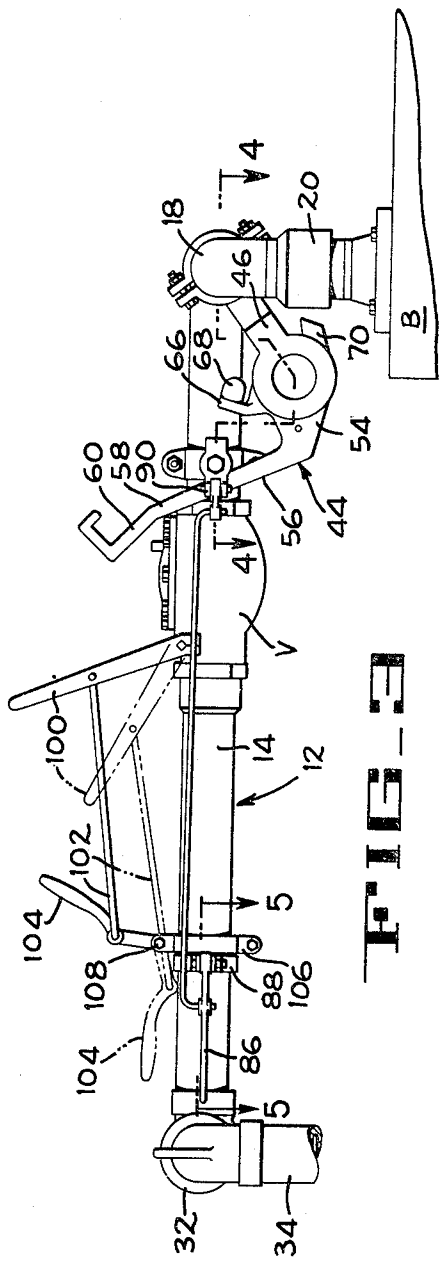
INVENTOR.
CLAIBORN COOLEY, JR.
BY *Francis W. Anderson*
ATTORNEY FIG_4
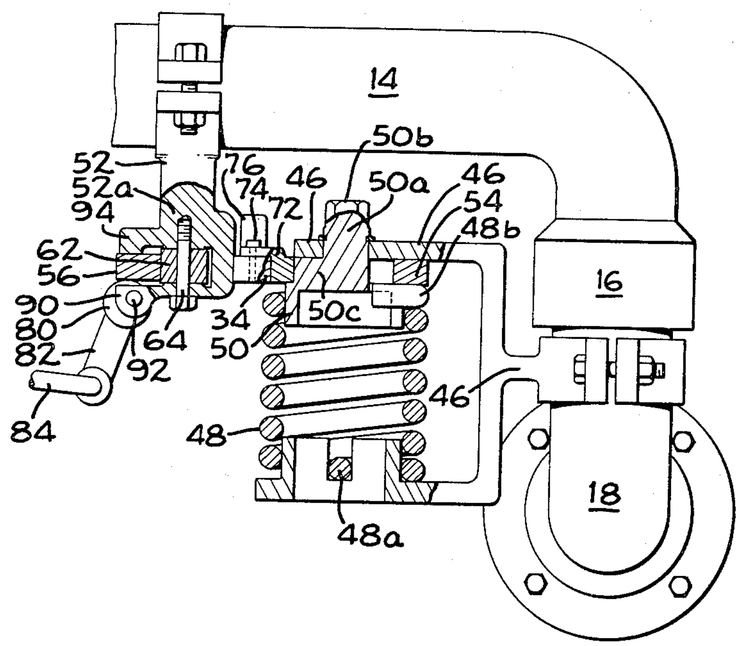
FIG_5
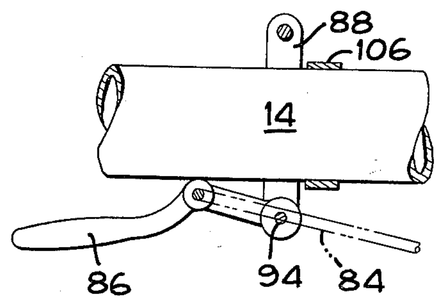
INVENTOR.
CLAIBORN COOLEY, JR.
BY
Francis W. Anderson
ATTORNEY 3,489,174
Patented Jan. 13, 1970

3,489,174

POSITION LOCKABLE, TORSION SPRING-BALANCED FLUID LOADING ARM

Claiborn Cooley, Jr., Houston, Tex., assignor to FMC Corporation, San Jose, Calif., a corporation of Delaware Continuation-in-part of application Ser. No. 453,956, May 7, 1965. This application May 9, 1967, Ser. No. 637,184
Int. Cl. F17d *1/08;* F16l *27/00;* B67d *5/04*
U.S. Cl. 137—615 4 Claims

ABSTRACT OF THE DISCLOSURE

A torsion spring-balanced fluid loading arm with a cam-type locking mechanism for securing the arm in any position between fully retracted and fully extended.

CROSS REFERENCE TO RELATED APPLICATION

This application is a continuation-in-part of my co-pending application Ser. No. 453,956, filed May 7, 1965, now Patent No. 3,378,033, and entitled "Balancing Mechanism."

BACKGROUND OF THE INVENTION

The field of art to which the present invention pertains includes fluid transfer systems with rigid tubular pivotally-connected conduits, particularly to so-called loading arms that are balanced by a torsion spring for pivotal movement about a horizontal axis, and to such arms with a valve in the flow line and an arrangement for maintaining the arm in any position between fully retracted and fully extended.

Transferring fluids from storage facilities into portable containers, for example loading tank trucks with gasoline, kerosene or other liquid petroleum-based products from bulk terminal reservoirs, is commonly accomplished through an articulated loading arm usually comprising two or more rigid tubular pivotally interconnected conduits. The arm is rotatably mounted on a base in fluid connection with the storage facility, and is positionable over the opening into the portable container. Because of their length and weight, many loading arms must be balanced on their bases so that the operator can extend and position the arm for fluid delivery and then retract it into its stowing position.

Among the various systems devised for balancing these arms is one containing a torsionally tensioned helical spring attached between the arm and its base in a way to oppose the gravitational force tending to cause the arm to fall. An example of such an apparatus is that disclosed and claimed in my above mentioned co-pending application Ser. No. 453,956, the disclosure of which is hereby made a part of this application. In that apparatus one end of the torsion spring is rigidly held by a bracket attached to the arm's base, and the other end is connected through a rotatable axle to a power lever that transmits the torsional tension on the spring to the arm. The spring tension, and thus the balancing force exerted on the arm, can be adjusted to any degree desired by rotating the axle, and the configuration of the power lever maintains the selected balance condition throughout the arm's operable range. As a result, regardless of the size of the arm one operator can maneuver it into any position.

Although the loading arm disclosed in my aforementioned copending application is highly satisfactory, it has been found that on some occasions a facility to lock the arm in a given position to prevent it from moving up or down, such as sometimes occurs when fluid is flowing through it, would be very desirable. Furthermore, since the operator normally is at or near the delivery end of the arm while the fluid is flowing, the locking facility ideally would be controllable at that location. An additional valuable improvement would be an arrangement to control the fluid valve from this same location, thus centralizing the operator's tasks at this one working area.

Accordingly, one of the objects of this invention is to provide an improved torsion spring-balanced fluid loading arm.

Another object of this invention is to provide a system for locking a torsion spring-balanced fluid loading arm in any position between fully extended and fully retracted.

Another object of this invention is to provide a remotely controllable position-locking mechanism for a torsion spring-balanced fluid loading arm.

Yet another object of this invention is to provide a cam-type lock for a torsion spring-balanced fluid loading arm, the lock interconnected with the torsion spring-balancing mechanism and operable from the location at which the arm is maneuvered.

Still another object of this invention is to provide a mechanism for remotely controlling the fluid valve in a torsion spring-balanced fluid loading arm.

SUMMARY OF THE INVENTION

Broadly considered, the present invention comprises a combination torsion spring-balancing and cam locking apparatus designed primarily for fluid transferring arms. More particularly, the invention comprises an articulated tubular fluid-loading arm with a torsion spring-balancing mechanism including a power lever that transmits a balancing force from the spring to the arm, and a cam-type arm locking mechanism that cooperates with the power lever to hold the arm against movement in either an up or down direction. This balancing and locking apparatus is adaptable for use on conduit-type arms of a large variety of sizes and shapes, is readily adjustable to a wide range of positions to accommodate varying loads and satisfy all arm positioning requirements, and can be fitted onto right or left hand, top or bottom, and overhead or underground loading arms without modification. The apparatus is removably clamped to the loading arm and thus is easily removed, such as for transfer to another arm. Furthermore, the apparatus is economical in construction, easy to operate, and does not interfere with operating personnel.

The arm balancing portion of the apparatus comprises a torsionally tensioned helical spring with one end rigidly connected to the arm's base through a bracket that prevents this end from rotating, and with the other end connected through a rotatable axle and a pawl and ratchet system to a power lever that transmits the tension of the spring to the arm as a balancing force that opposes the gravitational force tending to cause the arm to fall. As the arm is lowered the helical spring is coiled more tightly, thus increasing its torsional tension, so that the balancing force exerted by the power lever increases uniformly with the rate of increase in the arm's downward moment, i.e., the force tending to make the arm fall. The result is that the original degree of balance is maintained throughout the arm's upward and downward travel. In certain of its versions, the power lever also retards the speed of the arm as it approaches its fully retracted or stowing position, and cushions the arm as it comes to a stop in that position. The pawl and ratchet system facilitates rotation of the spring axle in either direction to adjust the spring's torsional tension to the desired degree.

The arm locking portion of the apparatus comprises a generally U-shaped clevis bracket rigidly attached to the arm and arranged to straddle the power lever. A cam is mounted for eccentric rotation on one side of this bracket opposite the power lever to contact the lever and press it against the other side of the bracket, thereby preventing the lever from moving with regard to the bracket and the arm. The handle for operating the cam is rotatably mounted on the arm where it will be readily accessible to the operator, and a control rod links the handle and the cam. One end of the rod is pivotally connected to the handle, and the rod's other end connects pivotally to a lever extending outwardly from the cam. Accordingly, by moving the handle forward, i.e., away from the cam, the control rod is drawn forward, pulling the outer end of the cam lever forward and rotating the cam against the power lever. The cam handle is positioned on the loading arm so that when the cam is against the power lever in arm-locking position the cam handle is held against the arm by the tension exerted on it by the control rod; thus the operator does not have to hold the cam handle forward to maintain the arm in locked condition, yet can easily and quickly release the arm simply by moving the cam handle away from the arm.

The balancing and locking apparatus of this invention can be used on many types of loading arms, the only requirements being a base of sufficient strength and a rotatable coupling between the base and the arm. For example, one popular arrangement comprises a rigid tubular arm coupled to a substantially vertical riser pipe base through a swivel joint that provides a horizontal axis of rotation between the riser pipe and the arm, one end of the torsion spring rigidly attached to the riser pipe and the other end rotatably connected through a pawl and ratchet system and a power lever to the arm. The balancing and locking apparatus also can be employed on extended reach loading arms, i.e., those wherein the base is extended from the riser by a length of tubular conduit rigidly attached to the riser, and the arm is pivotally connected to the outer end of this extension. In this arrangement, the apparatus is clamped to the outer end of the extension instead of to the riser itself. Other operable arrangements that will become readily apparent are also within the scope of this invention.

BRIEF DESCRIPTION OF THE DRAWINGS

FIGURE 1 is a view in side elevation of a typical loading arm on which is mounted the balancing and locking apparatus of this invention, showing the arm locked in its fully retracted or stowing position, the valve closed, and indicating in phantom lines the position of the arm when it is fully extended.

FIGURE 2 is a plan view of a loading arm similar to that of FIGURE 1, showing the arm locked in a partially extended position, the valve closed, and in phantom lines the position of the locking mechanism when the arm is unlocked.

FIGURE 3 is a view in side elevation of the arm of FIGURE 2, showing the position of the valve control linkage when the valve is closed, and in phantom lines the position of the linkage when the valve is locked open.

FIGURE 4 is a view taken generally along the lines 4—4 of FIGURE 3, and on an enlarged scale, better illustrating the details of the balancing and locking apparatus.

FIGURE 5 is a view taken generally along the lines 5—5 of FIGURE 3, and on the same scale as FIGURE 4, showing how the cam handle is mounted on the arm and, in phantom lines, the position of the control rod.

FIGURE 6 is a view in side elevation of a modified version of the power lever illustrated in FIGURES 1–3.

FIGURE 7 is a view in side elevation of another type of power lever according to this invention.

DESCRIPTION OF THE PREFERRED EMBODIMENTS

FIGURES 1-5 illustrate installations of the balancing and locking apparatus of this invention on two common types of articulated fluid loading arms. Both the arm 10 of FIGURE 1 and the arm 12 of FIGURES 2–5 comprise an inner or first conduit 14 provided with a well-known shut-off valve V, the conduit 14 mounted at its inner end on a riser pipe base 18 through a swivel joint 16 (FIGS. 2 and 4) for rotation about a horizontal axis. The riser 18 is mounted on a base B, such as a loading rack or dock, through another swivel joint 20 for rotation about a vertical axis, and of course communicates with a fluid storage area, not shown. In the arm 10, the outer end of the first conduit 14 is connected to the inner end of a second conduit 24 through a swivel joint 22, and a discharge conduit 30 connects to the outer end of the second conduit 24 through swivel joints 26, 28. In the arm 12, the outer end of the first conduit 14 is joined to the discharge conduit 34 through a swivel joint 32, there being no second conduit comparable to the conduit 24 of FIGURE 1. It should be understood that the balancing and locking apparatus of this invention is not restricted to the two types of loading arm illustrated in the drawings, for it also can be used on other arms such as the extended reach type wherein the arm is mounted on the end of a conduit extending out from the base.

As shown in FIGURES 1–5, the balancing and locking apparatus comprises a torsion spring balancing mechanism 40 and a locking mechanism 42, the two mechanisms interlinked through a power lever 44 that transmits the arm-balancing force from the mechanism 40, and the arm-locking restraint of the mechanism 42, to the first conduit 14.

The balancing mechanism 40 comprises a bracket 46 rigidly clamped to the riser 18, a helical torsion spring 48, a rotatable spring axle 50, the power lever 44, and a guide bracket 52 that is rigidly clamped to the first conduit 14. One end **48*a* of the spring 48 (FIG. 4) is held against rotation by a slot in the bracket 46, and the other end 48*b* fits into a slot in the axle 50 that is rotatably journaled in the bracket 46. The axle's shank portion 50*a* extends through the bracket 46 to terminate in an adjusting head 50*b* that provides a means for rotating the axle 50 to increase or decrease the torsional tension on the spring 48**.

The power lever 44 illustrated in FIGURES 1 through 4 comprises a generally cylindrical base 54 and an arm 56 extending outwardly from the base 54, the arm having a straight portion 58 and a distal angular portion 60. A friction-reducing roller 62 is mounted for rotation on the clevis portion **52*a* of the guide bracket 52 by a bolt 64, and the straight portion 58 of the power lever's arm 56 bears against this roller 62 when the loading arm is in a position other than fully retracted, while the angular portion 60 bears against the roller 62 when the loading arm is in its fully retracted or stowing position. Also extending from the power lever base 54 is a bracket 66 providing a mounting for a resilient bumper 68 that contacts the top surface of the bracket 46 to cushion the loading arm as it arrives at its fully retracted position (FIG. 1), and a second bumper 70 extends from the base 54 to contact the bottom surface of the bracket 46 should the torsion spring 48 fail and the loading arm fall. A common spring and bolt arrangement could be used in lieu of the bumper 68** if desired.

As illustrated best in FIGURE 4, the base 54 of the power lever 44 circumscribes a reduced portion **50*c* of the spring axle 50, and this reduced portion 50*c* has circumferentially spaced teeth (not shown) that are engaged by a pawl 72 pivotally mounted on the power lever base 54 by a pin 74. A handle 76 extends outwardly from the pawl 72 for pivoting it about the pin 74 to engage or disengage the pawl 72 from the spring axle teeth. When the pawl 72 and the teeth are engaged, the spring 40 is nonrotatably connected to the power lever 44. Under these circumstances and with the spring in tension, a rotary force is transmitted from the spring through the axle 50, the pawl 72, the lever 44, the roller 62, and the bracket 52 to the conduit 14**, opposing the force of gravity or moment acting on the loading arm in the opposite direction.

The configuration of the power lever 44 causes it to apply this rotary force to the loading arm in two manners. In the first manner the force balances and holds the arm in any position in which it is placed, and is applied by the straight portion 58. In the second, which is applied by the angular portion 60, the force causes the arm to move to its fully retracted or stowing position. In other words, when the straight portion 58 of the power lever arm 56 bears on the roller 62 the arm will remain where it is placed, whereas when the angular portion 60 bears against the roller 62 the force moves the arm to its stowing position as illustrated in FIGURE 1. Thus, one operator can move the arm into or out of any desired position, including its stowing position, with but slight effort.

The locking mechanism 42 comprises a cam 80, a cam lever 82 rigidly attached to and laterally extending from the cam 80, a cam control rod 84 pivotally connected at one end to the cam lever 82, and a cam control handle 86 pivotally connected to the other end of the rod 84 and also pivotally mounted on a clamp bracket 88 that is rigidly fastened to the conduit 14. A clevis bracket 90 extends from the outer side of the clevis portion **52*a* of the guide bracket 52, and the cam 80 is eccentrically mounted for rotation on the clevis bracket 90 by a pin 92. Thus, as the cam 80 is rotated clockwise as viewed in FIGURES 2 and 4, it moves toward the power lever arm 56, and sufficient rotation will cause the cam 80 to contact the arm 56 and force it against the extension 94 of the inner side of clevis portion 52*a*, thereby locking the power lever 44 to the bracket 52** and preventing movement of the loading arm in a vertical direction.

The cam 80 is rotated by rotation of the cam handle 86 about its pivot 94, as viewed in FIGURES 2 and 5. As the handle 86 is rotated toward the conduit 14, before it contacts the conduit the rod 84 passes over the pivot 94, and the bracket 88 is spaced from the cam so that once the rod has passed over the pivot 94 it tends to remain on that side of the pivot. Therefore, once the handle 86 is rotated against the conduit 14, it will remain there until it is pulled away, thereby locking the cam 80 against the power lever 44 and preventing movement of the loading arm in either an upward or downward direction.

Spacing the cam handle 86 from the cam 80 so that sufficient force is applied by the cam to lock the power lever 44 to the bracket 52 when the handle 86 is against the conduit 14, is accomplished by moving the bracket 88 along the conduit 14. If an increase in pressure of the cam 80 against the power lever 44 is required the bracket 88 is moved away from the cam 80, and if a decrease in pressure is required, the bracket 88 is adjusted towards the cam 80.

A valve control linkage for opening and closing the valve V from a remote location is illustrated in FIGURES 1–3. This linkage comprises a main valve operating handle 100, a valve control rod 102 pivotally connected at one end to the handle 100, and a remote valve operating handle 104 pivotally connected to the other end of the rod 102 and also pivotally mounted on a clamp bracket 106 that is rigidly fastened to the conduit 14. The arrangement of this linkage is the same as that of the loading arm locking mechanism, that is the bracket 106 is positioned on the conduit 14 so that when the handle 104 is against the conduit 14 it will remain there, locking the valve V wide open, until deliberately rotated away. This feature, of course, can be adjusted by moving the bracket 106 towards or away from the valve V.

Two variations in the power lever 44 are illustrated in FIGURES 6 and 7. The lever 112 of FIGURE 6 is identical in shape to the lever 44 of FIGURES 1 through 5, except that it has a retaining portion 114 to prevent the lever 112 from falling away from the roller 62 when the torsional tension on the spring 48 is removed, such as when the arm is being installed and adjusted, or if the spring fails. The arm 118 of the lever 116 in FIGURE 7 is entirely straight, i.e., it has no terminal angular portion equivalent to the angular portion 60 of the arm 56. Therefore, the lever 116 will not urge the loading arm into a stowing position, but will hold it in place, a variation that sometimes is preferable. A spring 120 holds a buffer plate 122 away from the end of the arm 116 to assist the bumper 68 in bringing the arm to a cushioned stop in its fully retracted or stowing position.

As can be readily seen, the balancing and locking apparatus of this invention provides an effective means for counteracting the weight of a loading arm and for locking the arm in any desired position between, and including, fully retracted and fully extended. The invention has the further advantage of being readily adaptable for use with loading arms of various sizes, weights and types, and is inexpensive to manufacture and easy to maintain.

Having completed a detailed description of the invention so that those skilled in the art could practice the same, I claim:

1. A balancing and locking apparatus for a material conveying member, said member pivotally connected to a support base for elevational movement with respect to the base, comprising first bracket means adapted for rigid but releasable clamping to said base; lever means rotatably mounted on said first bracket means; a second bracket means adapted for rigid but releasable clamping to said member; guide means for guiding said member in its elevational movement, said guide means including friction-reducing means mounted on said second bracket means; helical spring means rigidly attached to said first bracket means and rotatably attached to said lever means, whereby said spring means can be torsionally tensioned between said first bracket means and said lever means to urge said lever means against said friction-reducing means to counteract downward movement of said member; cam means eccentrically mounted for rotation on said guide means; a third bracket means adapted for rigid but releasable clamping to said member; cam-operating means pivotally mounted on said third bracket means and in spaced relation to said cam means; and rigid connecting means between said cam-operating means and said cam means, whereby the operation of said cam-operating means rotates said cam means against said lever means and locks said lever means to said guide means.

2. A position-lockable spring-balanced fluid loading arm, comprising a riser-type support base; an inner rigid conduit mounted for rotation about a horizontal axis on said base; a balancing mechanism for said loading arm comprising a first bracket releasably clamped to said support base, a helical spring rigidly attached at one end to said first bracket, a power lever mounted on said first bracket and rotatably attached to the other end of said spring, a second bracket releasably clamped to said inner conduit, and a guide means rigidly attached to said second bracket in the path of pivotal movement of said power lever for relative movement of said power lever with respect to said guide means during elevational movement of said inner conduit about said horizontal axis, whereby said spring means when tensioned applies a torque to said power lever to force said power lever against said guide means thereby to counteract the downward movement of said conduit about said horizontal axis; a position-locking mechanism for said arm comprising a cam attached for eccentric rotation on said guide means, a third bracket means releasably clamped to said conduit in spaced relation to said second bracket means, a cam-operating handle pivotally mounted at one end on said third bracket means, and a rigid link means interconnecting said cam and said cam-operating handle whereby rotation of said cam-operating handle towards said inner conduit rotates said cam means against said power lever to lock it to said guide means; and a flow control valve positioned in said inner conduit with a control lever extending therefrom, a fourth bracket releasably clamped to said inner conduit adjacent said third bracket, a valve handle pivotally attached at one end to said fourth bracket, and a rigid link means pivotally interconnecting said lever and said handle whereby rotation of said handle towards said inner conduit moves said lever and opens said valve.

3. A position-lockable balanced material loading arm, comprising a support base; a rigid conduit mounted on said support base for rotation about a first horizontal axis; a balancing mechanism for said conduit comprising a power lever, means mounting the power lever for pivotal movement about a second axis spaced from said first axis, a guide, means mounting said guide on said conduit in the path of pivotal movement of said power lever for relative movement of said power lever with respect to said guide during elevational movement of said conduit about said first axis, and means yieldably applying torque to said power lever about said second axis in a direction to force said power lever against said guide and thereby counteract the downward movement of said conduit about said first axis; and a position-locking mechanism for said conduit comprising a cam rotatably and eccentrically attached to said conduit for applying a force to said power lever to prevent said lever from moving with respect to said guide, a cam lever attached to and extending from said cam, a cam-operating control handle pivotally mounted at one end on a bracket that is releasably clamped to said conduit in spaced relation to said cam, and a rigid linking means pivotally connected to said cam lever and said control handle, whereby pivoting said control handle about its mounting on said bracket will cause the cam to rotate against said power lever and lock it to said guide, and spacing said control handle from said cam can be adjusted so that when said control handle is pivoted in one direction to a position against said conduit it will remain against said conduit until it is forcibly pivoted in the opposite direction.

4. A position-lockable balanced material loading arm, comprising a support base; a rigid conduit mounted on said support base for rotation about a first horizontal axis; a balancing mechanism for said conduit comprising a power lever, means mounting the power lever for pivotal movement about a second axis spaced from said first axis, a guide, means mounting said guide on said conduit in the path of pivotal movement of said power lever for relative movement of said power lever with respect to said guide during elevational movement of said conduit about said first axis, and means yieldably applying torque to said power lever about said second axis in a direction to force said power lever against said guide and thereby counteract the downward movement of said conduit about said first axis; a position-locking mechanism for said conduit comprising a cam attached for eccentric rotation to said conduit, a cam-operating handle pivotally mounted on said conduit in spaced relation to said cam, and a rigid linking means pivotally mounted on said handle and pivotally connected to said cam, whereby rotation of said handle about its pivotal mounting will cause the cam to rotate against and lock said lever to said conduit; and a flow line valve mechanism for said conduit, said valve mechanism including a valve housing, a valve lever attached to a flow control means in said housing and extending outwardly from said housing, a valve control handle pivotally mounted at one end on a bracket releasably mounted on said conduit in spaced relation to said valve, and rigid linking means pivotally interconnecting said valve lever and said valve control handle, whereby pivoting said valve control handle against said conduit opens said valve and locks it in said open condition.

References Cited

UNITED STATES PATENTS

| | | | |
|---|---|---|---|
| 742,044 | 10/1903 | Low | 212—49 |
| 3,086,552 | 4/1963 | Ragsdale | 137—615 |
| 3,378,033 | 4/1968 | Cooley | 137—615 |

WILLIAM F. O'DEA, Primary Examiner

H. M. COHN, Assistant Examiner

U.S. Cl. X.R.

248—292